US012550586B2

(12) United States Patent
Park et al.

(10) Patent No.: US 12,550,586 B2
(45) Date of Patent: Feb. 10, 2026

(54) COVER WINDOW PROTECTIVE FILM AND DISPLAY DEVICE INCLUDING THE SAME

(71) Applicant: Samsung Display Co., LTD., Yongin-si (KR)

(72) Inventors: Jun Su Park, Seoul (KR); Hyun Ju Lee, Asan-si (KR); Eun Kyeong Cha, Asan-si (KR); Young Gil Park, Asan-si (KR); Na Ri Ahn, Seongnam-si (KR); Soo Im Jeong, Hwaseong-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 1357 days.

(21) Appl. No.: 17/213,373

(22) Filed: Mar. 26, 2021

(65) Prior Publication Data

US 2022/0009213 A1    Jan. 13, 2022

(30) Foreign Application Priority Data

Jul. 9, 2020 (KR) .................. 10-2020-0084686

(51) Int. Cl.
| | |
|---|---|
| *H10K 59/80* | (2023.01) |
| *B32B 27/36* | (2006.01) |
| *G02B 1/14* | (2015.01) |
| *G06F 1/16* | (2006.01) |
| *G06F 1/20* | (2006.01) |

(52) U.S. Cl.
CPC ........... *H10K 59/87* (2023.02); *B32B 27/365* (2013.01); *G02B 1/14* (2015.01); *G06F 1/1652* (2013.01); *H10K 59/873* (2023.02); *B32B 2255/26* (2013.01); *B32B 2307/42* (2013.01); *B32B 2307/51* (2013.01); *B32B 2307/536* (2013.01); *B32B 2457/20* (2013.01); *G06F 1/203* (2013.01)

(58) Field of Classification Search
CPC ............. B32B 27/365; B32B 2255/26; B32B 2307/42; B32B 2307/51; B32B 2307/536; B32B 2457/20; G02B 1/14; G06F 1/1652; G06F 1/203; H10K 59/87; H10K 59/873
See application file for complete search history.

(56) References Cited

U.S. PATENT DOCUMENTS

| | | | |
|---|---|---|---|
| 9,568,617 | B2 | 2/2017 | Ichimura |
| 10,446,792 | B2 | 10/2019 | Xie et al. |

(Continued)

FOREIGN PATENT DOCUMENTS

| | | |
|---|---|---|
| CN | 105355647 A | 2/2016 |
| CN | 105785420 A | 7/2016 |

(Continued)

OTHER PUBLICATIONS

JP 6040936 B2 Machine Translation (Year: 2016).*

(Continued)

*Primary Examiner* — Travis M Figg
(74) *Attorney, Agent, or Firm* — CANTOR COLBURN LLP

(57) ABSTRACT

A cover window protective film includes a base layer, and a first protective layer disposed on the base layer, where the first protective layer includes a lower surface adjacent to the base layer and an upper surface opposite to the lower surface, and the first protective layer includes a fluorine-based compound, and has an atomic ratio of fluorine (F) gradually increasing from the lower surface toward the upper surface.

20 Claims, 18 Drawing Sheets

(56) References Cited

U.S. PATENT DOCUMENTS

| | | | |
|---|---|---|---|
| 10,665,816 B2 | 5/2020 | Oh et al. | |
| 11,812,635 B2 | 11/2023 | Oh et al. | |
| 11,974,452 B2 | 4/2024 | Oh et al. | |
| 2003/0017297 A1 | 1/2003 | Song et al. | |
| 2014/0006532 A1 | 1/2014 | Yanagi | |
| 2014/0065326 A1* | 3/2014 | Lee | G09F 9/301 428/12 |
| 2015/0158268 A1* | 6/2015 | Koike | B32B 27/42 156/247 |
| 2016/0369131 A1 | 12/2016 | Lim et al. | |
| 2017/0263891 A1* | 9/2017 | Oh | H01L 25/18 |
| 2020/0081162 A1* | 3/2020 | Park | H10K 59/87 |
| 2020/0125772 A1* | 4/2020 | Volos | H04L 9/3268 |
| 2021/0122669 A1 | 4/2021 | Lee et al. | |
| 2024/0040825 A1 | 2/2024 | Oh et al. | |

FOREIGN PATENT DOCUMENTS

| | | | | |
|---|---|---|---|---|
| CN | 106291778 A | | 1/2017 | |
| CN | 110092936 | | 8/2019 | |
| CN | 110927834 A | | 3/2020 | |
| JP | 2005235717 A | | 9/2005 | |
| JP | 6040936 B2 | * | 12/2016 | ........... G02F 1/1335 |
| JP | 6080154 B2 | * | 2/2017 | |
| KR | 1020110037622 A | | 4/2011 | |
| KR | 1020110088010 A | | 8/2011 | |
| KR | 20180058912 A | * | 6/2018 | ............... C09D 7/63 |
| KR | 1020180058912 A | | 6/2018 | |
| KR | 1020190052730 A | | 5/2019 | |
| KR | 1020210048614 | | 5/2021 | |

OTHER PUBLICATIONS

JP 6080154 B2 Machine Translation (Year: 2017).*
Danielle Macoretta, et al., "Clear Antismudge Unimolecular Coatings of Diblock Copolymers On Glass Plates", ACS Applied Materials Interfaces, (2014), vol. 6, pp. 21435-21445.
Y. Kim et al., "Measurement of Hardness and Friction Properties of Pencil Leads for Quantification of Pencil Hardness Test", Advance in Applied Ceramics, (2016), vol. 115, No. 8, pp. 443-448.
Extended European Search Report—European Application No. 21184146.5 dated Dec. 8, 2021.

* cited by examiner

COVER WINDOW PROTECTIVE FILM AND DISPLAY DEVICE INCLUDING THE SAME

This application claims priority to Korean Patent Application No. 10-2020-0084686 filed on Jul. 9, 2020, and all the benefits accruing therefrom under 35 U.S.C. § 119, the content of which in its entirety is herein incorporated by reference.

BACKGROUND

1. Field

The disclosure relates to a cover window protective film and a display device including the cover window protective film, and, more particularly to a foldable display device including the cover window protective film.

2. Description of the Related Art

Electronic appliances, such as smart phones, tablet personal computers ("PC"s), digital cameras, notebook/laptop computers, navigators, and smart televisions, which provide images to users, typically include display devices for displaying images.

Recently, a foldable display device has attracted considerable attention. The foldable display device may have desirable features of both a smart phone and a tablet PC such as portability and a wide screen.

SUMMARY

Folding operations of a foldable display device may apply stress to each layer constituting the display device. When some layers are exposed to such stress by repeating folding and unfolding, defects such as cracks may occur.

Embodiments of the disclosure are to provide a cover window protective film having improved wear resistance and chemical resistance to prevent fingerprints from being stained even in repeated usage, and a display device including the cover window protective film.

According to an embodiment of the disclosure, a cover window protective film, comprises a base layer, and a first protective layer disposed on the base layer, wherein the first protective layer includes a lower surface adjacent to the base layer and an upper surface opposite to the lower surface, and the first protective layer includes a fluorine-based compound, and has an atomic ratio of fluorine (F) gradually increasing from the lower surface toward the upper surface.

In an embodiment, the atomic ratio of fluorine (F) may be the highest at the upper surface of the first protective layer.

In an embodiment, the atomic ratio of fluorine (F) at the upper surface of the first protective layer may be in a range of about 10 atomic percent (at %) to about 40 at %.

In an embodiment, the first protective layer may further include carbon (C), and a ratio of the atomic ratio of fluorine (F) to the atomic ratio of carbon (C) at the upper surface of the first protective layer may be in a range of about 0.15 to about 1.20.

In an embodiment, the atomic ratio of fluorine (F) and the atomic ratio of carbon (C) may be values measured by X-ray photoelectron spectroscopy.

In an embodiment, the upper surface of the first protective layer may have a modulus in a range of about 4.5 gigapascal (GPa) to about 10 GPa.

In an embodiment, the upper surface of the first protective layer may have a hardness in a range of about 0.35 GPa to about 1.00 GPa.

In an embodiment, the modulus and hardness may be values measured by a nanoindenter.

In an embodiment, the first protective layer may have a thickness in a range of about 2 micrometers (μm) to about 7 μm.

In an embodiment, the cover window protective film may further include a second protective layer disposed on the upper surface of the first protective layer, wherein an upper surface of the second protective layer may have a modulus in a range of about 4.5 GPa to about 10 GPa and a hardness in a range of about 0.35 GPa to about 1.00 GPa.

According to an embodiment of the disclosure, a display device includes a display panel, and a front laminate structure disposed on a front surface of the display panel, where the front laminate structure includes a cover window and a cover window protective film attached onto the cover window, the cover window protective film includes a base layer and a first protective layer disposed on the base layer, where the first protective layer includes a fluorine-based compound. In such an embodiment, the first protective layer includes a lower surface adjacent to the base layer and an upper surface opposite to the lower surface, and the first protective layer has an atomic ratio of fluorine (F) higher at the upper surface of the first protective layer than at the lower surface of the first protective layer.

In an embodiment, the front laminate structure may further include a polarization member disposed between the display panel and the cover window, and a polarization member coupling member which attaches the polarization member to the one surface of the display panel.

In an embodiment, the front laminate structure may further include a shock absorbing layer disposed between the polarization member and the cover window, and a shock absorbing layer coupling member which attaches the shock absorbing layer onto the polarization member.

In an embodiment, the display panel may further include a back laminate structure disposed on a back surface of the display panel, and the back laminate structure may include a polymer film layer disposed behind the display panel, a cushion layer disposed behind the polymer film layer, a plate disposed behind the cushion layer, and a heat dissipation member disposed behind the plate.

In an embodiment, an atomic ratio of fluorine (F) at the upper surface of the first protective layer may be in a range of about 10 at % to about 40 at %, the first protective layer further includes carbon (C), a ratio of the atomic ratio of fluorine (F) to the atomic ratio of carbon (C) at the upper surface of the first protective may be is in a range of about 0.15 to about 1.20, and the atomic ratio of fluorine (F) and the atomic ratio of carbon (C) may be values measured by X-ray photoelectron spectroscopy.

In an embodiment, the upper surface of the first protective layer may have a modulus in a range of about 4.5 GPa to about 10 GPa, the upper surface of the first protective layer has a hardness in a range of about 0.35 GPa to about 1.00 GPa, and the modulus and hardness may be values measured by a nanoindenter.

In an embodiment, the first protective layer may have a thickness in a range of about 2 μm to about 7 μm.

In an embodiment, the display device may further include a second protective layer disposed on the upper surface of the first protective layer, where an upper surface of the second protective layer may have a modulus in a range of about 4.5 GPa to about 10 GPa and a hardness in a range of about 0.35 GPa to about 1.00 GPa.

In an embodiment, the display panel displays an image in a forward direction.

In an embodiment, the display device may be an in-foldable display device, in which a display surface is folded inward, or an out-foldable display device, in which the display surface is folded outward.

BRIEF DESCRIPTION OF THE DRAWINGS

The above and other features of the disclosure will become more apparent by describing in detail embodiments thereof with reference to the attached drawings, in which.

DETAILED DESCRIPTION

Figure 1:
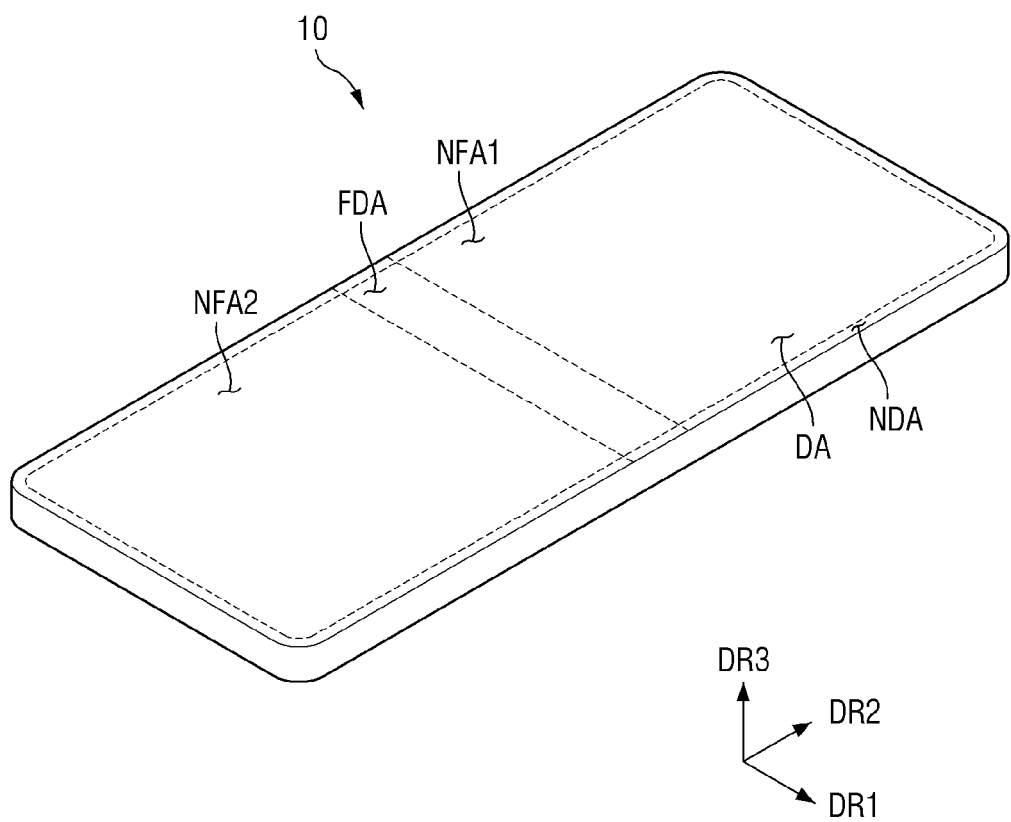
FIG. 1 is a perspective view illustrating a display device in an unfolded state according to an embodiment.

The invention will now be described more fully hereinafter with reference to the accompanying drawings, in which various embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will also be understood that when a layer is referred to as being "on" another layer or substrate, it can be directly on the other layer or substrate, or intervening layers may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, embodiments of the disclosure will be described in detail with reference to the accompanying drawings.

Figure 2:
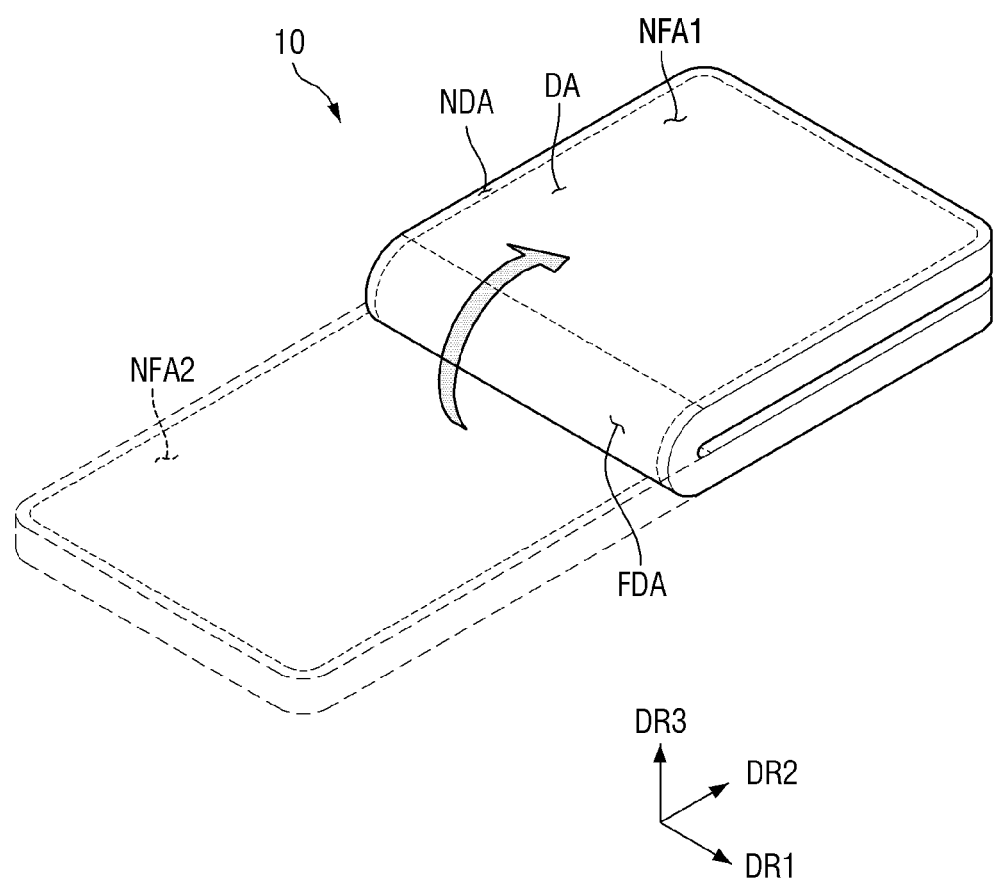
FIG. 2 is a perspective view illustrating a display device in a folded state according to an embodiment.

FIG. 1 is a perspective view illustrating a display device in an unfolded state according to an embodiment, and FIG. 2 is a perspective view illustrating a display device in a folded state according to an embodiment.

Referring to FIG. 1, an embodiment of a display device 10 may be a foldable display device. Hereinafter, for convenience of description, embodiments where the display device 10 is a smart phone will be described in detail, but the disclosure is not limited thereto. In such an embodiment, the display device 10 may be applied to portable phones, tablet personal computers ("PC"s), personal digital assistants ("PDA"s), portable multimedia players ("PMP"s), televisions, game machines, wrist-watch type electronic devices, head mount displays, monitors of personal computers, notebook computers, car navigators, car dashboards, digital cameras, camcorders, billboards, medical devices, inspection devices, various home appliances such as refrigerators and washing machines, and internet of thing devices, in addition to smart phones.

In FIGS. 1 and 2, a first direction DR1 may be a direction parallel to one side of the display device 10 when viewed on a plane, for example, may be a vertical or length direction of the display device 10. A second direction DR2 may be a direction parallel to the other side of the display device contacting one side of the display device 10 when viewed on the plane, for example, may be a horizontal or width direction of the display device 10. A third direction DR3 may be a thickness direction of the display device 10.

In an embodiment, the display device 10 may have a rectangular shape when viewed on the plane or viewed from a plan view in the third direction DR3. The display device 10 may have a rectangular shape where corners are right angled or a rectangular shape where corners are round when viewed on the plane. The display device 10 may include two short sides arranged in the first direction DR1 and two long sides arranged in the second direction DR2 when viewed on the plane.

The display device 10 may include a display area DA and a non-display area NDA. When viewed on the plane, the shape of the display area DA may correspond to the shape of the display device 10. In one embodiment, for example, where the display device 10 has a rectangular shape when viewed on the plane, the display area DA may also have rectangular shape.

The display area DA may be an area where a plurality of pixels are provided to display an image. The plurality of pixels may be arranged in a matrix form. In an embodiment, each of the plurality of pixels may have a rectangular shape, a rhombus shape, or a square shape when viewed on the plane, but the shape thereof is not limited thereto. In one alternative embodiment, for example, each of the plurality of pixels may have a polygonal shape, a circular shape, or an elliptic shape when viewed on the plane.

The non-display area NDA may be an area where no pixel is provided such that no image is displayed thereon. The non-display area NDA may be disposed around the display area DA. In an embodiment, the non-display area NDA may be disposed to surround the display area DA as shown in FIG. 1, but the disclosure is not limited thereto. In an alternative embodiment, the display area DA may be partially surrounded by the non-display area NDA.

In an embodiment, the display device 10 may be maintained in both a folded state and an unfolded state. In an embodiment, as shown in FIG. 2, the display device 10 may be folded in an in-folding manner in which the display area DA is disposed inside. When the display device 10 is folded in an in-folding manner, the upper surfaces of the display device 10 may be disposed to face each other. In an embodiment, the display device 10 may be folded in an out-folding manner in which the display area DA is disposed outside. When the display device 10 is folded in an out-folding manner, the lower surfaces of the display devices 10 may be disposed to face each other.

In an embodiment, the display device 10 may be a foldable device. As used herein, a foldable device is a device capable of being folded, and refers to a device capable of being in both a folded state and an unfolded state as well as a folded device. Further, folding typically refers to a case where the display device 10 is folded at an angle of about 180°, but the disclosure is not limited thereto, and may refer to a case where the display device 10 is folded at an angle of more than 180° or less than 180° or a case where the display device 10 is folded at an angle of 90° or more and less than 180° or 120° or more and less than 180°. Moreover, the folded state may be referred to as a folded state when the display device 10 is folded out of an unfolding state, even if complete folding is not performed. Even if the display device 10 is folded at an angle of 90° or less, as long as the maximum folding angle is 90° or more, for example, it may be expressed that the display device 10 is in the folded state to be distinguish from the unfolded state. The radius of curvature (refer to "R" in FIG. 4) during folding may be about 5 millimeters (mm) or less, e.g., in a range of about 1 mm to about 2 mm, or about 1.5 mm, but is not limited thereto.

In an embodiment, the display device 10 may include a folding area FDA, a first non-folding area NFA1, and a second non-folding area NFA2. The folding area FDA is an area where the display device 10 is folded. The first non-folding area NFA1 and the second non-folding area NFA2 may be areas where the display device 10 is not folded.

The first non-folding area NFA1 may be disposed at one side of the folding area FDA, for example, at the upper side thereof. The second non-folding area NFA2 may be disposed at the other side of the folding area FDA, for example, at the lower side thereof. The folding area FDA may be an area bent at a predetermined curvature.

In an embodiment, the folding area FDA of the display device 10 may be defined at a specific location. In the display device 10, a single folding area FDA or two or more folding areas FDA may be defined at a specific location. In an alternative embodiment, the location of the folding area FDA is not specified in the display device 10, and may be freely set in various areas.

In an embodiment, the display device 10 may be folded in the second direction DR2. Thus, the length of the display device 10 in the second direction DR2 may be reduced to approximately half, so that the user may conveniently carry the display device 10.

In an embodiment, the folding direction of the display device 10 is not limited to the second direction DR2. In one alternative embodiment, for example, when the display device 10 is folded in the first direction DR1, the length of the display device 10 in the first direction DR1 may be reduced to approximately half.

In an embodiment, as illustrated in FIGS. 1 and 2, each of the display area DA and the non-display area NDA overlaps the folding area FDA, the first non-folding area NFA1, and the second non-folding area NFA2, but the disclosure is not limited thereto. In one embodiment, for example, each of the display area DA and the non-display area NDA may overlap at least one selected from the folding area FDA, the first non-folding area NFA1, and the second non-folding area NFA2.

Figure 3:
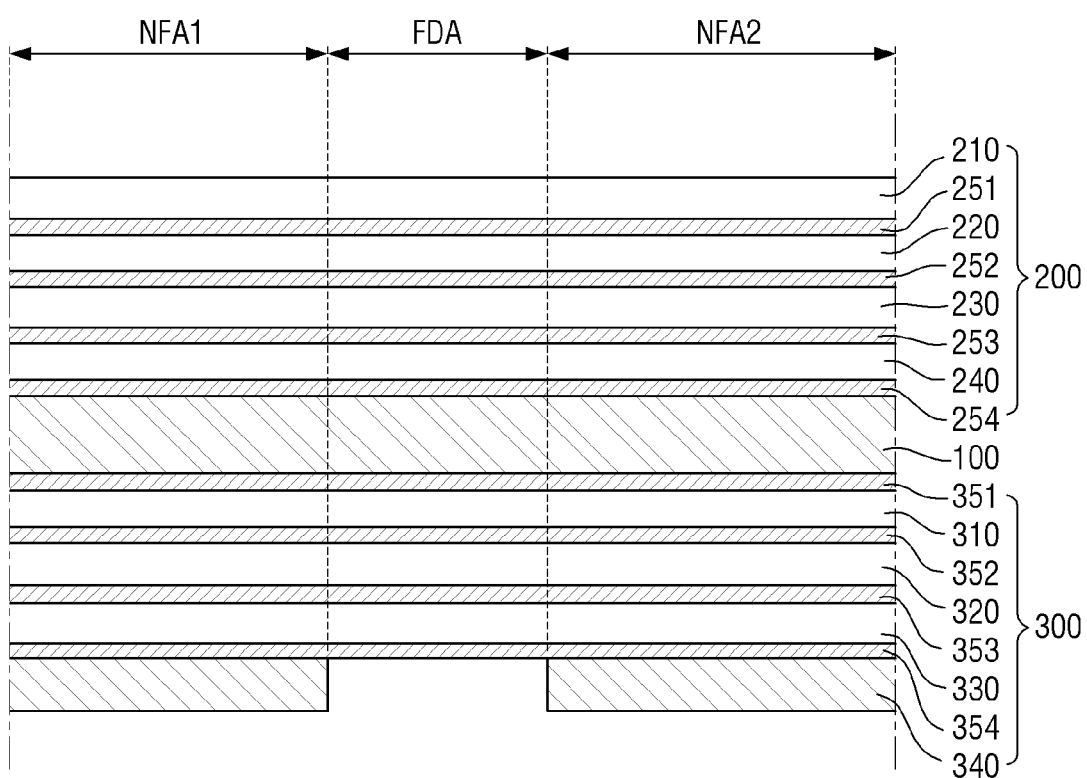
FIG. 3 is a cross-sectional view of a display device in an unfolded state according to an embodiment.
Figure 4:
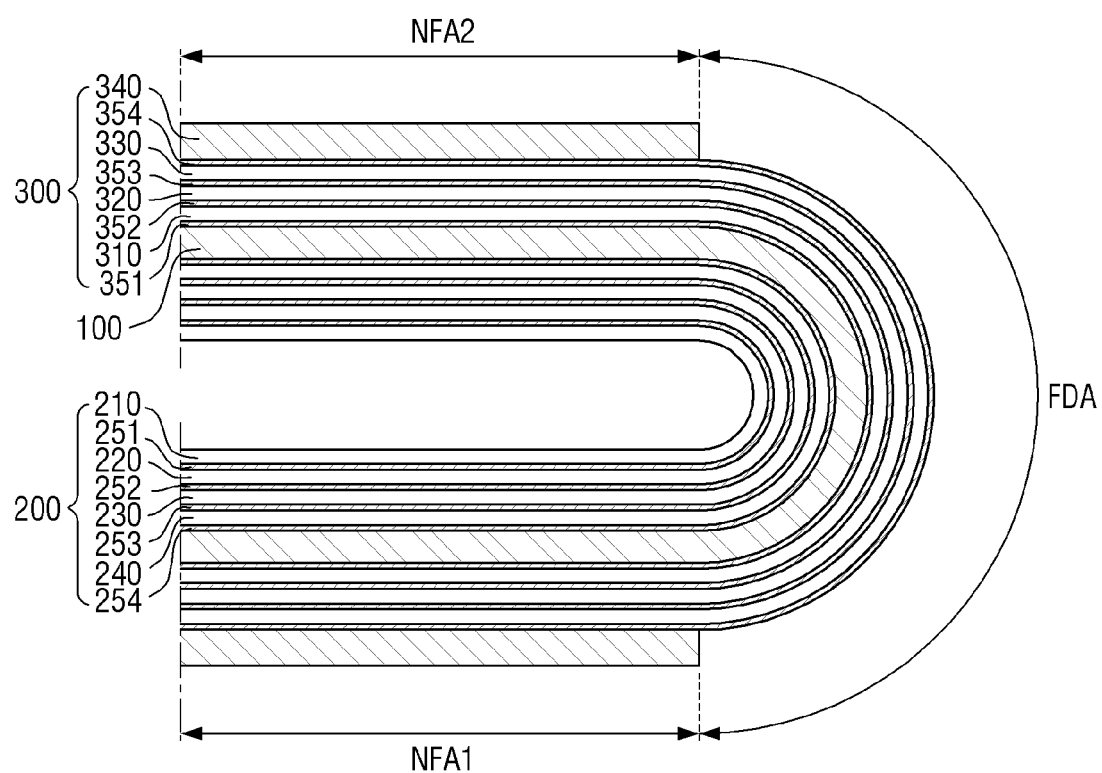
FIG. 4 is a cross-sectional view of a display device in a folded state according to an embodiment.

FIG. 3 is a cross-sectional view of a display device in an unfolded state according to an embodiment, and FIG. 4 is a cross-sectional view of a display device in a folded state according to an embodiment.

Referring to FIGS. 3 and 4, an embodiment of the display device 10 may include a display panel 100, a front laminate structure 200 laminated in front of the display panel 100, and a back laminate structure 300 laminated behind the display panel 100. Each of the laminate structures 200 and 300 may include at least one coupling member 251 to 253, 345 and 351 to 353. Here, the front of the display panel 100 refers to a direction in which the display panel 100 displays a screen, and the back of the display panel refers to a direction opposite to the front of the display panel 100. One surface of the display panel 100 is located in front of the display panel 100, and the other surface of the display panel 100 is located behind the display panel 100.

The display panel 100 is a panel for defining a screen or displaying an image, and may include self-light emitting display panels such as an organic light emitting display panel ("OLED"), an inorganic light emitting (inorganic "EL") display panel, a quantum dot light emitting display panel ("QED"), a micro-light emitting diode (micro-"LED") display panel, a nano LED display panel, a plasma display panel ("PDP"), a field emission display ("FED") panel, and a cathode ray tube ("CRT") display panel; and light-receiving display panels such as liquid crystal display ("LCD") panel and an electrophoretic display ("EPD") panel. Hereinafter, for convenience of description, embodiments where the display panel 100 is an organic light emitting display panel will be described in detail, and unless otherwise specified, the organic light emitting display panel applied to the embodiment will be simply referred to as a display panel. However, embodiments are not limited to the organic light emitting display panel, and other types of display panel listed above or known in the art may be applied within the teachings herein.

The display panel 100 may further include a touch member. The touch member may be provided as a separate panel or film from the display panel 100 and attached to the display panel 100, or may be provided in the form of a touch layer inside the display panel 100. In an embodiment, the touch member is provided inside the display panel 100 and included in the display panel 100 is illustrated, but is not limited thereto.

Figure 5:
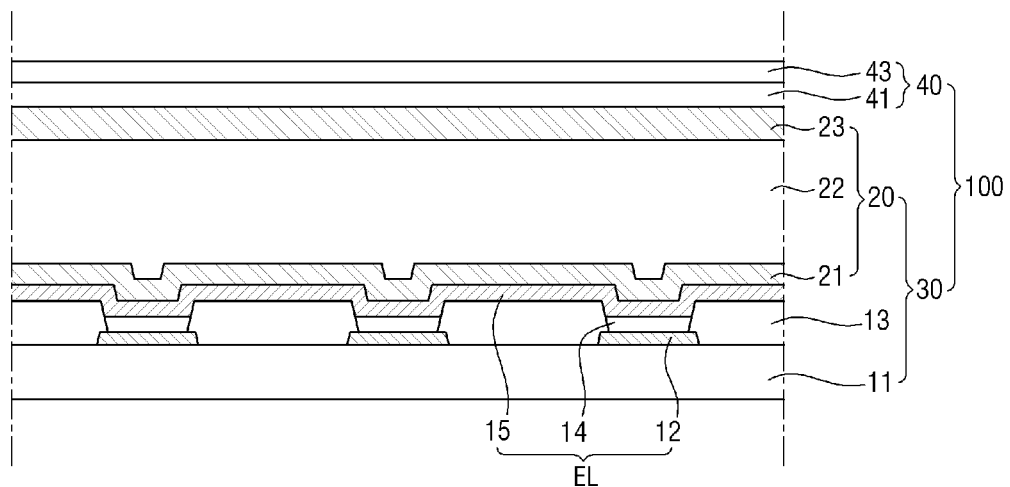
FIG. 5 is a cross-sectional view of a display panel according to an embodiment.

FIG. 5 is a cross-sectional view of a display panel according to an embodiment.

Referring to FIG. 5, an embodiment of the display device 10 may include a display panel 100. The display panel 100 may include a display layer 30 and a touch sensor 40 on the display layer 30. In such an embodiment, the display layer 30 may include a base substrate 11, a first electrode 12, a pixel defining layer 13, a light emitting layer 14, a second electrode 15, and an encapsulation layer 20.

The base substrate 11 may be an insulating substrate. In an embodiment, the base substrate 11 may be flexible, and may include a polymer material having flexibility. In such an embodiment, the polymer material may include polyimide ("PI"), polyethersulphone ("PES"), polyacrylate ("PA"), polyarylate ("PAR"), polyetherimide ("PEI"), polyethylenenaphthalate. ("PEN"), polyethyleneterepthalate ("PET"), polyphenylenesulfide ("PPS"), polyallylate, polycarbonate ("PC"), cellulose triacetate ("CAT"), cellulose acetate propionate ("CAP"), or a combination thereof.

The first electrode 12 may be disposed on the base substrate 11. In an embodiment, the first electrode 12 may be an anode electrode. In an embodiment, a plurality of components (not shown) may further be disposed between the base substrate 11 and the first electrode 12. In such an embodiment, the plurality of components may include a buffer layer, a plurality of conductive wirings, an insulating layer, and a plurality of thin film transistors, for example.

The pixel defining layer 20 may be disposed on the first electrode 12. In such an embodiment, an opening exposing at least a part of the first electrode 12 is defined through the pixel defining layer 20.

The light emitting layer 14 may be disposed on the first electrode 12. In an embodiment, the light emitting layer 14 may emit one of red light, green light, and blue light. The wavelength of red light may be in a range of about 620 nanometers (nm) to about 750 nm, the wavelength of green light may be in a range of about 495 nm to about 570 nm, and the wavelength of blue light may be in a range of about 450 nm to about 495 nm. The light emitting layer 14 may be formed as a single layer. Alternatively, the light emitting layer 14 may have a structure in which a plurality of organic light emitting layers are laminated one on another, for example, a tandem structure. In another alternative embodiment, the light emitting layer 14 may emit white light. In such an embodiment where the light emitting layer 14 emits white light, the light emitting layer 14 may have a structure in which a red organic light emitting layer, a green organic light emitting layer, and a blue organic light emitting layer are laminated one on another.

The second electrode 15 may be disposed on the light emitting layer 14 and the pixel defining layer 13. In an embodiment, the second electrode 15 may be formed entirely on the light emitting layer 14 and the pixel defining layer 13. In an embodiment, the second electrode 15 may be a cathode electrode.

The first electrode 12, the second electrode 15, and the light emitting layer 14 may constitute a light emitting element EL.

The encapsulation layer 20 may be disposed on the light emitting element EL. The encapsulation layer 20 may encapsulate the light emitting element EL and prevent moisture or the like from flowing into the light emitting device EL from the outside.

In an embodiment, the encapsulation layer 20 may be implemented as a thin film encapsulation, and may include one or more organic films and one or more inorganic films. In one embodiment, for example, the encapsulation layer 20 includes a first inorganic film 21 disposed on the second electrode 15, an organic film 22 disposed on the first inorganic film 21, and a second inorganic film 23 disposed on the organic film 22.

The first inorganic film 21 may prevent moisture, oxygen, and the like from penetrating into the light emitting element EL. The first inorganic film 21 may include or be made of at least one material selected from silicon nitride, aluminum nitride, zirconium nitride, titanium nitride, hafnium nitride, tantalum nitride, silicon oxide, aluminum oxide, titanium oxide, tin oxide, cerium oxide, and silicon oxynitride (SiON).

The organic film 22 may be disposed on the first inorganic film 21. The organic film 22 may improve flatness or provide a flat surface on layers therebelow. The organic film 22 may include or be formed of a liquid organic material, and for example, may include at least one material selected from acrylic resin, methacrylic resin, polyisoprene, vinyl resin, epoxy resin, urethane resin, cellulose resin, and perylene resin. Such an organic material may be provided on the base substrate 11 through deposition, printing, and coating, and may be subjected to a curing process to form the organic film 22.

The second inorganic film 23 may be disposed on the organic film 22. The second inorganic film 23 may perform a role substantially the same as or similar to that of the first inorganic film 21, and may include or be formed of a material substantially the same or similar to that of the first inorganic film 21. The second inorganic film 23 may completely cover the organic film 22. In an embodiment, the second inorganic film 23 and the first inorganic film 21 may contact each other in the non-display area NDA to form an inorganic-inorganic junction. However, the structure of the encapsulation layer 20 is not limited thereto, and the laminate structure of the encapsulation layer 20 may be variously changed or modified. Alternatively, the encapsulation layer 20 may be formed as a glass substrate or the like.

The touch sensor 40 may be disposed on the encapsulation layer 20. In an embodiment, the touch sensor 40 may be disposed directly on the encapsulation layer 20. In such an embodiment, the encapsulation layer 20 may function as a base portion of the touch sensor 40.

The touch sensor 40 may include a touch element layer 41 and a protective layer 43. The touch element layer 41 may include a touch electrode and a touch signal line connected to the touch electrode. In an embodiment, the touch electrode may include a metal and may have a mesh shape. In such an embodiment, the touch electrode may include or be formed of a metal mesh pattern, and thus the flexibility of the touch element layer 41 may be improved.

The protective layer 43 may be disposed on the touch element layer 41, and may protect the touch element layer 41. In an embodiment, the protective layer 43 may include an organic material, and may include or be made of, for example, an acrylic polymer. In such an embodiment where the protective layer 43 is made of an organic material, the flexibility of the touch sensor 40 may be improved.

Referring back to FIGS. 3 and 4, the front laminate structure 200 may be disposed in front of the display panel 100. The front laminate structure 200 may include a polarization member 240, a shock absorbing layer 230, a cover window 220, and a cover window protective film 210, which are sequentially laminated forward from the display panel 100.

The polarization member 240 polarizes transmitted light. The polarization member 240 may serve to reduce the reflection of external light. In an embodiment, the polarization member 240 may be a polarization film. The polarization film may include a polarization layer and a protective substrate sandwiching the polarization layer from the top and bottom thereof. The polarization layer may include polyvinyl alcohol. The polarization layer may be stretched in one direction. The stretching direction of the polarization layer may be an absorption axis, and the direction perpendicular thereto may be a transmission axis. The protective substrate may be disposed on one surface and the other surface of the polarizing layer. The protective substrate may include or be made of a cellulose resin such as TAC, a polyester resin, or the like, but the material thereof is not limited thereto.

The shock absorbing layer 230 may be disposed in front of the polarization member 240. The shock absorbing layer 230 may serve to protect a structure such as a display panel thereunder from an external shock. In an embodiment, the shock absorbing layer 230 may be a polymer film. The polymer film may include at least one material selected from PET, PEN, PES, PI, PAR, PC, polymethyl methacrylate ("PMMA"), and cycloolefin copolymer ("COC").

The cover window 220 may be disposed in front of the shock absorbing layer 230. The cover window 220 serves to protect the display panel 100. The cover window 220 may include or be made of a transparent material. The cover window 220 may include or be made of, for example, a glass or a plastic.

In an embodiment where the cover window 220 includes a glass, the glass may be ultra-thin glass ("UTG") or thin glass. In an embodiment where the glass is formed as an ultra-thin film or a thin film, the cover window 220 has flexible properties, and may thus be warped, bent, folded, or rolled. The thickness of the glass may be, for example, in a range of about 10 micrometers (μm) to about 300 μm, and specifically, glass having a thickness in a range of about 10 μm to about 100 μm, e.g., a thickness of about 30 μm, may be applied. The glass of the cover window 220 may include soda lime glass, alkali alumino silicate glass, borosilicate glass, or lithium alumina silicate glass. The glass of the cover window 220 may include chemically reinforced or thermally reinforced glass to have high strength. The chemical reinforcement may be achieved through an ion exchange treatment process in an alkali salt. The ion exchange treatment process may be performed two or more times. In an embodiment, the cover window 220 may be formed by coating both side surfaces of a polymer film with a glass thin film.

Referring to FIGS. 3 and 4, in an embodiment where the cover window 220 includes a plastic, the cover window 220 may have flexible properties such as folding. In such an embodiment, the plastic included in the cover window 220 may include, but are not limited to, at least one material selected from PI, PA, PMMA, PC, PEN, polyvinylidene chloride, polyvinylidene difluoride ("PVDF"), polystyrene, ethylene-vinyl alcohol copolymers, PES, PEI, PPS, polyallylate, triacetyl cellulose ("TAC"), and CAP. The plastic cover window 220 may be formed of one or more of the plastic materials listed above.

The cover window protective film 210 may be disposed in front of the cover window 220. The cover window protective film 210 may perform at least one function selected from scattering prevention, absorbing shock, stamping prevention, fingerprint prevention, and glare prevention of the cover window 220. The cover window protective film 210 may include a transparent polymer film. The transparent polymer film may include at least one material selected from PET, PEN, PES, PI, PAR, PC, PMMA, and COC resin.

The cover window protective film 210 may include a base layer and a protective layer disposed thereon. The protective layer may have high hardness for protecting the cover window 220, and may have a modulus of such a degree not to be deformed when the display device 10 repeatedly performs folding and unfolding operations. In such an embodiment, the protective layer may include or be made of a material containing specific components such that fingerprints do not remain on the surface thereof when the user uses the display device 10. The cover window protective film 210 be described later in greater detail.

The front laminate structure 200 may further include front coupling members 251 to 254 that couples adjacent laminated members to each other. In one embodiment, for example, a first coupling member 251 may be disposed between the cover window 220 and the cover window protective film 210 to couple them to each other, a second coupling member 252 may be disposed between the cover window 220 and the shock absorbing layer 230 to couple them to each other, a third coupling member 253 may be disposed between the shock absorbing layer 230 and the polarization member 240 to couple them to each other, and a fourth coupling member 254 may be disposed between the polarization member 240 and the display panel 100 to couple them to each other. In such an embodiment, the front coupling members 251 to 254 are members that attach layers on one surface of the display panel 100. The first coupling member 251 may be a protective layer coupling member for attaching the cover window protective film 210, the second coupling member 252 may be a window coupling member for attaching the cover window 220, the third coupling member 253 may be a shock absorbing layer coupling member for attaching the shock absorbing layer 230, and the fourth coupling member 254 may be a polarizing unit coupling member for attaching the polarization member 240. Each of the front coupling members 251 to 254 may be optically transparent.

The back laminate structure 300 is disposed behind the display panel 100. The back laminate structure 300 may include a polymer film layer 310, a cushion layer 320, a plate 330, and a heat dissipation member 340, which are sequentially laminated backward from the display panel 100.

The polymer film layer 310 may include a polymer film. The polymer film layer 310 may include, for example, at least one material selected from PI, PET, PC, polyethylene ("PE"), polypropylene ("PP"), polysulfone ("PSF"), PMMA, TAC, and cycloolefin polymer ("COP"). The polymer film layer 310 may include a functional layer in at least one surface thereof. The functional layer may include, for example, a light absorbing layer. The light absorbing layer may include a light absorbing material such as black pigment or dye. The light absorbing layer may be formed on the polymer film by coating or printing using black ink.

The cushion layer 320 may be disposed behind the polymer film layer 310. The cushion layer 320 may absorb an external shock to prevent the display panel 100 from being damaged. The cushion layer 320 may be formed as a single layer or a plurality of laminated layers. The cushion layer 320 may include, for example, a material having elasticity such as polyurethane resin or polyethylene resin.

In an embodiment, the cushion layer 320 may include or be made of a foam material similar to a sponge.

The plate 330 may be disposed behind the cushion layer 320. The plate 330 may be a support member for coupling the display device 10 to a case. The plate 330 may include a material having rigidity. In an embodiment, the plate 330 may include or be made of a metal or a metal alloy such as stainless steel ("SUS").

The heat dissipation member 340 may be disposed behind the plate 330. The heat dissipation member 340 serves to diffuse heat generated from the display panel 100 or other components of the display device 10. The heat dissipation member 340 may include a metal plate. The metal plate may include, for example, a metal having high thermal conductivity, such as copper or silver. The heat dissipation member 340 may be a heat dissipation sheet including graphite or carbon nanotubes.

The heat dissipation member 340 may be separated based on the folding area FDA to facilitate the folding of the display device 10 as illustrated in FIGS. 3 and 4. However, the disclosure is not limited thereto. In one alternative embodiment, for example, a first metal plate may be disposed in the first non-folding area NFA1, and a second metal plate may be disposed in the second non-folding area NFA2. The first metal plate and the second metal plate may be physically spaced apart from each other based on the folding area FDA.

The back laminate structure 300 may further include back coupling members 351 to 354 that couples adjacent laminated members to each other. In one embodiment, for example, a fifth coupling member 351 may be disposed between the display panel 100 and the polymer film layer 310 to couple them to each other, a sixth coupling member 352 may be disposed between the polymer film layer 310 and the cushion layer 320 to couple them to each other, a seventh coupling member 353 may be disposed between the cushion layer 320 and the plate 330 to couple them to each other, and an eighth coupling member 354 may be disposed between the plate 330 and the heat dissipation member 340 to couple them to each other.

Figure 6:
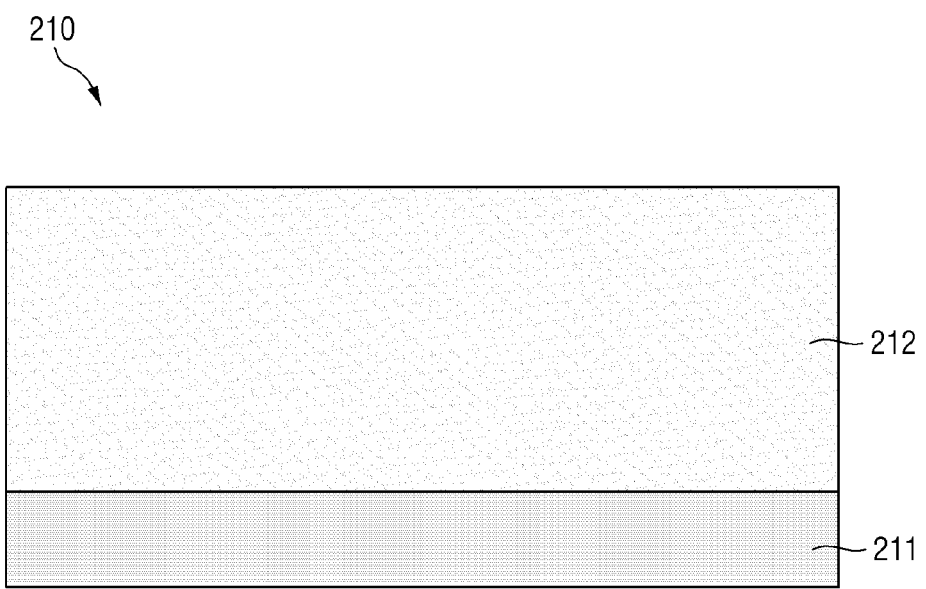
FIG. 6 is a schematic cross-sectional view of a cover window protective film according to an embodiment.
Figure 7:
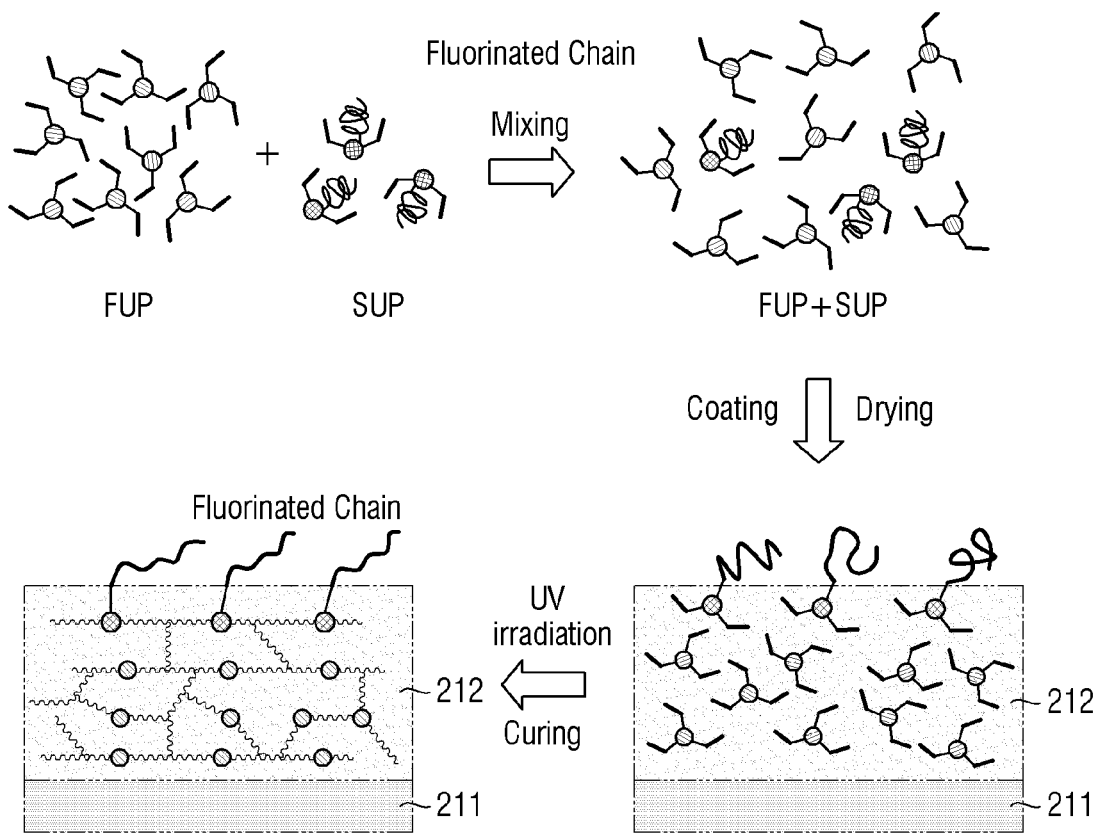
FIG. 7 is a schematic view illustrating an embodiment of a process of manufacturing a cover window protective film.

FIG. 6 is a schematic cross-sectional view of a cover window protective film according to an embodiment, and FIG. 7 is a schematic view illustrating an embodiment of a process of manufacturing a cover window protective film.

Referring to FIG. 6, an embodiment of the cover window protective film 210 may include a base layer 211 and a first protective layer 212 disposed on the base layer 211.

The base layer 211 may include a transparent polymer film. The transparent polymer film may include at least one material selected from PET, PEN, PES, PI, PAR, PC, PMMA, and COC.

In an embodiment, a thickness of the base layer 211 may be in a range of about 10 μm to about 300 μm, or in a range of about 30 μm to about 100 μm, e.g., about 50 μm. However, the disclosure is not limited thereto.

The first protective layer 212 may be disposed on the base layer 211. The first protective layer 212 may have wear resistance and chemical resistance to protect the cover window 220. In an embodiment, the first protective layer 212 may have hardness and modulus characteristics within a specific range such that the cover window protective film is not damaged even if the display device 10 repeats folding and unfolding several times. In such an embodiment, the first protective layer 212 may have anti-fingerprint characteristics such that fingerprints do not remain on the surface thereof when a user uses the display device 10.

In a case where a layer having high hardness and modulus characteristics and a layer having anti-fingerprint characteristics are disposed separately, as the display device 10 repeatedly performs folding and unfolding operations, bonding between these layers may be weakened, or stains may remain due to damage to an anti-fingerprint layer. In an embodiment of the cover window protective film 210, the first protective layer 212 disposed on the base layer 211 may have high hardness and modulus properties, and may be formed as a single layer in which components capable of securing anti-fingerprint characteristics are mixed.

In an embodiment, the first protective layer 212 may be a hard coating layer formed directly on one surface of the base layer 211. The first protective layer 212 may be directly applied on the base layer 211 without an adhesive layer. In an alternative embodiment, the first protective layer 212 may be attached onto the base layer 211 through an adhesive layer.

The first protective layer 212 may include at least one material selected from PI, PC, PES, PEN, PPS, liquid crystal polymer ("LCP"), PMMA, acrylic polymer and epoxy polymer, and may have a specific range of hardness and a specific range of modulus. In an embodiment, the aforementioned polymers may be polymers for hard coating. In an embodiment, the first protective layer 212 may further include a fluorine-based polymer to have anti-fingerprint characteristics.

Referring to FIG. 7, the first protective layer 212 may be formed by applying a solution in which first unit polymers FUP for forming a polymer capable of having a specific range of hardness and modulus and second unit polymers SUP for forming a polymer capable of having anti-fingerprint characteristics are mixed, dying the solution, and then curing the solution with UV. In such an embodiment, when the first unit polymers FUP and the second unit polymers SUP are cured to form a polymer chain, the second unit polymers SUP having anti-fingerprint characteristics may be polymerized on the surface of the first protective layer 212, and may be crosslinked with the polymer formed by the first unit polymers FUP. In an embodiment, the second unit polymers SUP may include a fluorine-based polymer to have anti-fingerprint characteristics. In an embodiment, the solution in which the first unit polymers FUP and the second unit polymers SUP are mixed may further include a solvent and a crosslinking agent, and may also include a photoinitiator.

In an embodiment, the atomic ratio of fluorine (F) in the second unit polymer formed on the surface of the first protective layer 212 may be determined depending on the crosslink density between the polymers formed by the first unit polymer FUP and the second unit polymer SUP. The crosslink density may be controlled by the content of the added crosslinking agent. In such an embodiment, the hardness, modulus, wear resistance and chemical resistance of the first protective layer 212 may vary depending on the crosslink density between polymers.

In an embodiment, the modulus and hardness of the first protective layer 212 and the atomic ratio (at %) of fluorine (F) at the surface thereof may vary depending on the crosslink density between the polymers. When the modulus becomes too large depending on the crosslink density of the polymers, the wear resistance of the first protective layer 212 may be low, and when the crosslink density becomes too low, in the evaluation of chemical resistance, chemicals may be introduced into the first protective layer 212, and thus chemical resistance may deteriorate. In an embodiment, the first protective layer 212 of the cover window protective film 210 may have a specific range of hardness and modulus, and the atomic ratio (at %) of fluorine (F) measured at the surface of the first protective layer 212 may be within a specific range.

According to an embodiment, the first protective layer 212 may have an atomic ratio of fluorine (F) in a range of about 10 at % to about 40 at %, measured at the surface thereof, and a ratio of the atomic ratio (at %) of fluorine (F) to the atomic ratio (at %) of carbon (C) in the polymer chain may be in a range of about 0.15 to about 1.20. This value may be a value obtained by dividing the atomic ratio of fluorine (F) by the atomic ratio of carbon (C). In an embodiment, the first protective layer 212 of the cover window protective film 210 may have hardness in a range of about 0.35 gigapascal (Gpa) to about 1.00 Gpa and a modulus in a range of about 4.5 Gpa to about 10 Gpa. When the physical properties of the first protective layer 212 are within the above range, the cover window protective film 210 may have high wear resistance and chemical resistance.

In an embodiment, the atomic ratio (at %) of fluorine (F) in the first protective layer 212 may gradually increase from the lower surface of the first protective layer 212 to the upper surface thereof. The lower surface of the first protective layer 212 may be a surface contacting the base layer 211, and the upper surface may be a surface opposite to the lower surface. In such an embodiment, as described above, when the first unit polymer FUP and the second unit polymer SUP are cured to form a polymer chain during the process of forming the first protective layer 212, the second unit polymers SUP having anti-fingerprint characteristics may be polymerized on the surface of the first protective layer 212, and may be crosslinked with the polymer formed by the first unit polymers FUP. In such an embodiment, during a ultraviolet ("UV") irradiation process, the first unit polymer FUP and the second unit polymer SUP are self-separated at a temperature of about 100° C. or lower, so that the second unit polymers SUP, which are fluorine-based polymers, may be distributed adjacent to the surface of the first protective layer 212.

Accordingly, the atomic ratio (at %) of fluorine (F) in the first protective layer 212 may have a distribution gradually increasing from the lower surface of the first protective layer 212 to the upper surface thereof. That is, the atomic ratio of fluorine (F) at the upper surface of the first protective layer 212 may be greater than the atomic ratio of fluorine (F) at the lower surface thereof, and the atomic ratio of fluorine (F) at the upper surface of the first protective layer 212 may be the largest. As the atomic ratio of fluorine (F) present at the upper surface of the first protective layer 212 increases, the first protective layer 212 may have high wear resistance and chemical resistance.

In an embodiment, the thickness of the first protective layer 212 may be in a range of about 1 μm to about 100 μm, or about 3 μm to about 20 μm. In one embodiment, the thickness of the first protective layer 212 may be in a range of about 3 μm to about 6 μm. However, the thickness thereof is not limited thereto.

Figure 8:
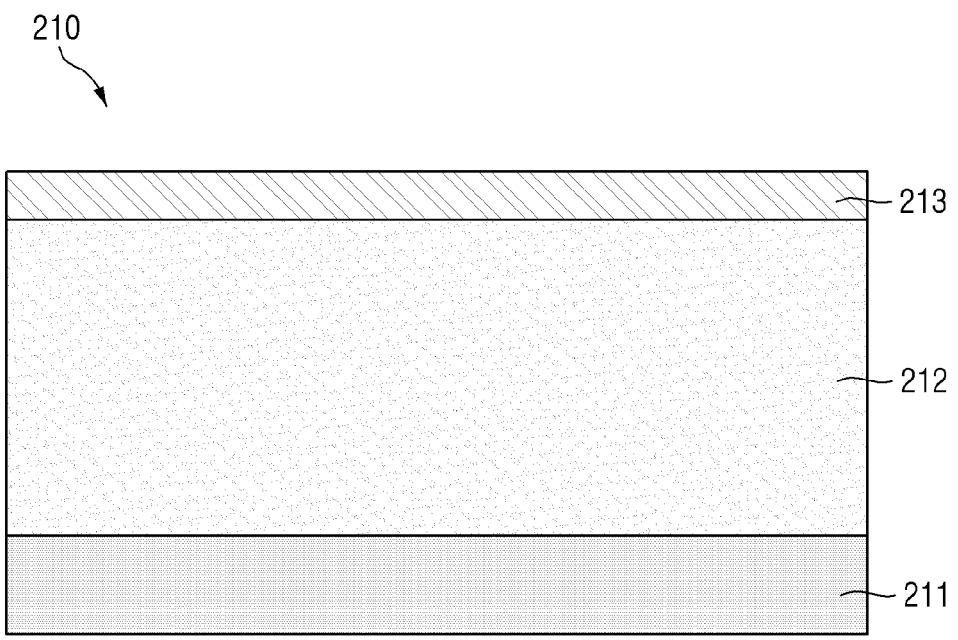
FIG. 8 is a schematic cross-sectional view of a cover window protective film according to an alternative embodiment.

FIG. 8 is a schematic cross-sectional view of a cover window protective film according to an alternative embodiment.

Referring to FIG. 8, such an embodiment of the cover window protective film is substantially the same as the embodiment of the cover window protective film described above with reference to FIG. 6 except that that the cover window protective film further includes a second protective layer 213. The same or like elements shown in FIG. 8 have been labeled with the same reference characters as used above to describe the embodiment of the cover window protective film shown in FIG. 6, and any repetitive detailed description thereof will hereinafter be omitted or simplified.

Referring to FIG. 8, in an embodiment of the cover window protective film 210, a second protective layer 213 may be disposed on the first protective layer 212. The second protective layer 213 may be disposed on the first protective layer 212 to provide anti-fingerprint characteristics to the cover window protective film. The second protective layer 213 may be formed by direct deposition on the first protective layer 212.

The second protective layer 213 may include carbon, oxygen, and fluorine. In one embodiment, for example, the second protective layer 213 may include an organic or inorganic compound and a fluorine compound. The second protective layer 213 may include or be formed of a conventional material known in the art in addition to the above-described materials. A thickness of the second protective layer 213 may be in a range of about 10 angstrom (Å) to about 1000 Å, or about 50 Å to about 500 Å. In one embodiment, for example, the thickness of the second protective layer 213 may be in a range of about 100 Å to about 300 Å, but is not limited thereto. The second protective layer 213 may be formed by any one method selected from sputtering, chemical vapor deposition ("CVD"), plasma-enhanced chemical vapor deposition ("PECVD"), spray pyrolysis, and electron beam ("E-Beam)", but the disclosure is not limited thereto. Since the second protective layer 213 has high interfacial adhesion with the first protective layer 212 due to the existence of fluorine (F) at the upper surface of the first protective layer 212, the configuration of additional bonding layer may be omitted.

In an embodiment, the second protective layer 213 may have a specific range of modulus and a specific range of hardness to protect the cover window protective film 210 and have anti-fingerprint characteristics. In an embodiment, the second protective layer 213 may have an atomic ratio of fluorine (F) in a range of about 10 at % to about 40 at %, when measured at the surface thereof, and a ratio of the atomic ratio (at %) of fluorine (F) to the atomic ratio (at %) of carbon (C) may be in a range of about 0.15 to about 1.20. In an embodiment, the second protective layer 213 may have hardness in a range of about 0.35 Gpa to about 1.00 Gpa and a modulus in a range of about 4.5 Gpa to about 10 Gpa. When the physical properties of the second protective layer 213 are within the above range, the cover window protective film 210 may have high wear resistance and chemical resistance.

In an embodiment, the second protective layer 213 may contain fluorine in common with the first protective layer 212. Fluorine may be uniformly distributed in the second protective layer 213. That is, the second protective layer 213 is different from the first protective layer 212 in that the second protective layer 213 does not have a distribution in which the atomic ratio of fluorine gradually increases or decreases, as in the first protective layer 212. In an embodiment, the atomic ratio of fluorine (F) may gradually increase from the lower surface of the first protective layer 212 to the upper surface thereof, the atomic ratio of fluorine (F) may increase due to the second protective layer 213 at the interface between the first protective layer 212 and the second protective layer 213, and the atomic ratio of fluorine (F) may be uniformly maintained in the second protective layer 213.

Figure 9:
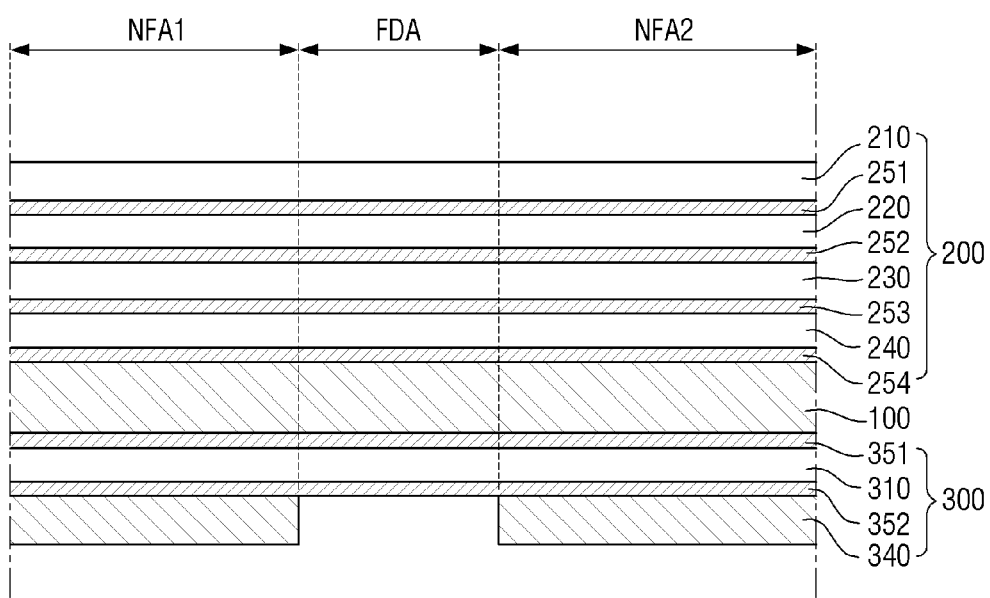
FIG. 9 is a cross-sectional view of a display panel according to an alternative embodiment.
Figure 10:
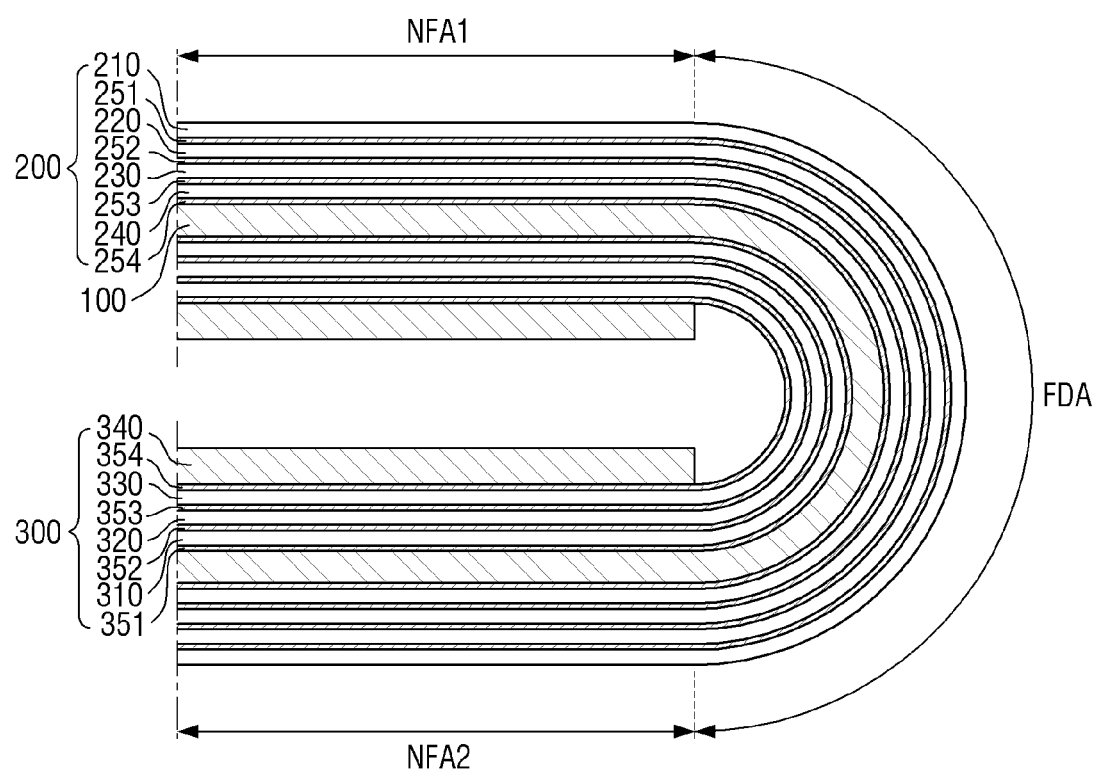
FIG. 10 is a cross-sectional view of a display panel according to another alternative embodiment.

Hereinafter, other alternative embodiments will be described. FIGS. 9 and 10 illustrate embodiments where the display device has various laminate structures.

FIG. 9 is a cross-sectional view of a display panel according to an alternative embodiment, and FIG. 10 is a cross-sectional view of a display panel according to another alternative embodiment.

Referring to FIG. 9, such an embodiment of the display device 10 is substantially the same as the embodiment of the display device 10 of FIG. 3 except that the cushion layer 320, a seventh coupling member 353, the plate 330, and the eighth coupling member 354 are omitted.

Referring to FIG. 10, such an embodiment of the display device 10 has the same stack structure as the embodiment of the display device 10 of FIG. 3, but is different from the embodiment of the display device 10 of FIG. 3 in that folding is performed in an out-folding method in which a display surface faces outward.

Since the configuration of the embodiments of FIGS. 9 and 10 may be substantially the same as those described above with reference to FIG. 3, any repetitive detailed description thereof will be omitted.

Hereinafter, embodiments will be described in greater detail through preparation examples and experimental examples.

Preparation Example 1: Preparation of Cover Window Protective Film

A plurality of cover window protective film samples, each having a laminate structure as shown in FIG. 6, were prepared. Sample #1, sample #2, and sample #3 were prepared in a same manner as each other, except that the content ratio of the second unit polymer (fluorine-based component) forming a fluorine-based polymer having anti-fingerprint characteristics was different from each other. Further, a cover window protective film sample #4 having a laminate structure as shown in FIG. 8 was prepared. Sample #4 was prepared by forming a second protective layer on the upper surface of sample #2 using electron beam.

Figure 11:
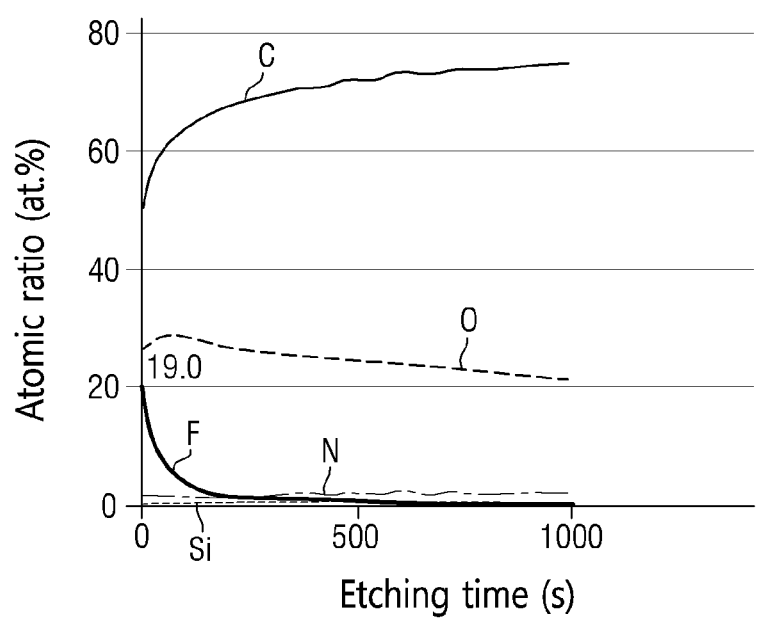
FIG. 11 is a graph illustrating the composition of sample #1 with respect to etching time.
Figure 12:
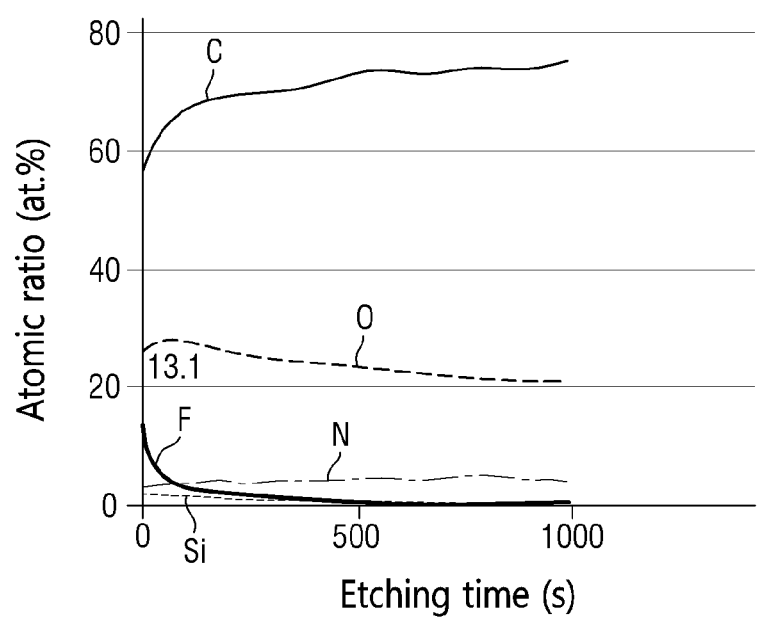
FIG. 12 is a graph illustrating the composition of sample #2 with respect to etching time.
Figure 13:
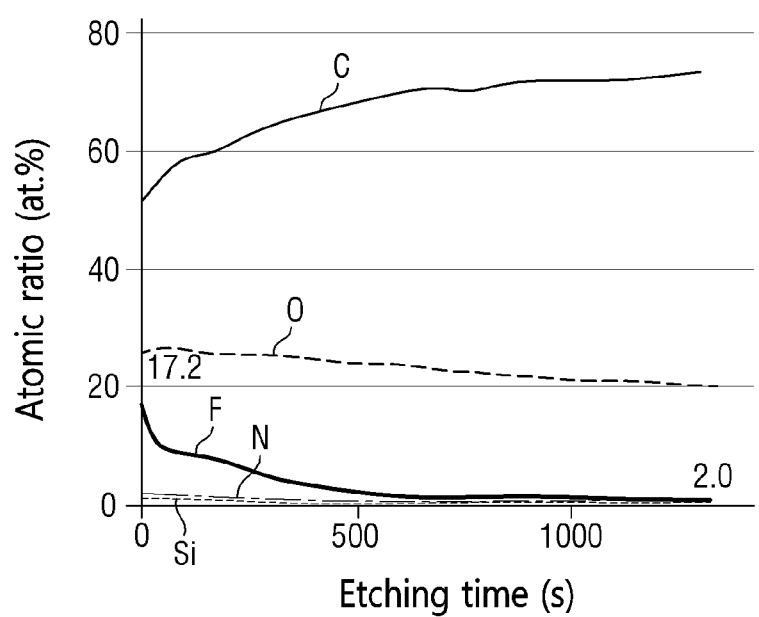
FIG. 13 is a graph illustrating the composition of sample #3 with respect to etching time.

The surface composition ratios of the first protective layer according to sample #1, sample #2, and sample #3 were measured, and are shown in Table 1 below and FIGS. 11 to 13. FIG. 11 is a graph illustrating the composition according to the etching time of Sample #1, FIG. 12 is a graph illustrating the composition according to the etching time of Sample #2, and FIG. 13 is a graph illustrating the composition according to the etching time of Sample #3. Here, the etching time refers to time taken to perform etching in the thickness direction.

Measurement of surface compositions was performed using an X-ray photoelectron spectrometer of Thermo Scientific Corporation. Surface composition of samples each having a surface etching size of 2 mm×2 mm were measured using Al kα X-ray (1486.6 eV) under the conditions of a spot size of 400 μm, ion source emission energy of gas cluster ion sputter (Ar source) of 4 keV, and an ion current of 7 nanoampere (nA). [F]/[C] composition ratios were calculated using the atomic ratios (at %) of fluorine (F) and carbon (C).

TABLE 1

| Sample (#) | | | Sample #1 | Sample #2 | Sample #3 |
|---|---|---|---|---|---|
| Addition amount of fluorine-based ingredients (ratio) | | | 1 | 1.2 | 2 |
| Surface composition (XPS) | Atomic ratio (at %) | C | 50.8 | 55.3 | 52.2 |
| | | F | 19.0 | 13.1 | 17.2 |
| | | O | 26.7 | 26.6 | 27.0 |
| | | Si | 1.8 | 1.8 | 2.1 |
| | | N | 1.7 | 3.1 | 1.6 |
| | [F]/[C] composition ratio | | 0.37 | 0.24 | 0.33 |

Referring to Table 1 above and FIGS. 11 to 13, it may be found that the atomic ratio of fluorine (F) at the surface of each of sample #1, sample #2, and sample #3 is in a range of 10 at % to 40 at %, and a ratio of the atomic ratio of fluorine (F) to the atomic ratio of carbon (C) ([F]/[C]) is in a range of 0.15 to 1.20. Further, it may be found that the atomic ratio of fluorine (F) gradually decreases as the first protective layer is etched in the thickness direction. That is, it may be found that the atomic ratio of fluorine (F) gradually decreases toward the surface of the first protective layer.

Among these samples, for sample #2, samples were prepared by repeating processes several times, and the surface compositions thereof were evaluated. The results thereof are given in Table 2 below.

TABLE 2

| Sample #2 | | | 1 | 2 | 3 | 4 |
|---|---|---|---|---|---|---|
| Addition amount of fluorine-based ingredients (ratio) | | | 1.2 | 1.2 | 1.2 | 1.2 |
| Surface composition (XPS) | Atomic ratio (at %) | C | 55.3 | 58.7 | 57.4 | 56.7 |
| | | F | 13.1 | 9.6 | 11.5 | 11.9 |
| | | O | 26.6 | 27 | 26.5 | 26.8 |
| | | Si | 1.8 | 1.9 | 1.8 | 1.8 |
| | | N | 3.1 | 2.8 | 2.8 | 2.8 |
| | [F]/[C] composition ratio | | 0.24 | 0.16 | 0.20 | 0.21 |

Referring to Table 2, in the evaluations of surface compositions several times, it may be found that the composition ratio of fluorine and carbon is 0.15 or more, and the atomic ratio of fluorine at the surface is in a range of 10 at % to 40 at %, except for the second evaluation.

Experimental Example 1: Measurement of Physical Properties of Cover Window Protective Film The hardness and modulus of the first protective layer of each of sample #1, sample #2, and sample #3 of Preparation Example were measured. The hardness and modulus thereof were measured through an indenter evaluation method (ISO 14577), the measurement method is shown in FIG. 14, and the results thereof are shown in Table 3 below and FIGS. 15 and 16.

Figure 14:
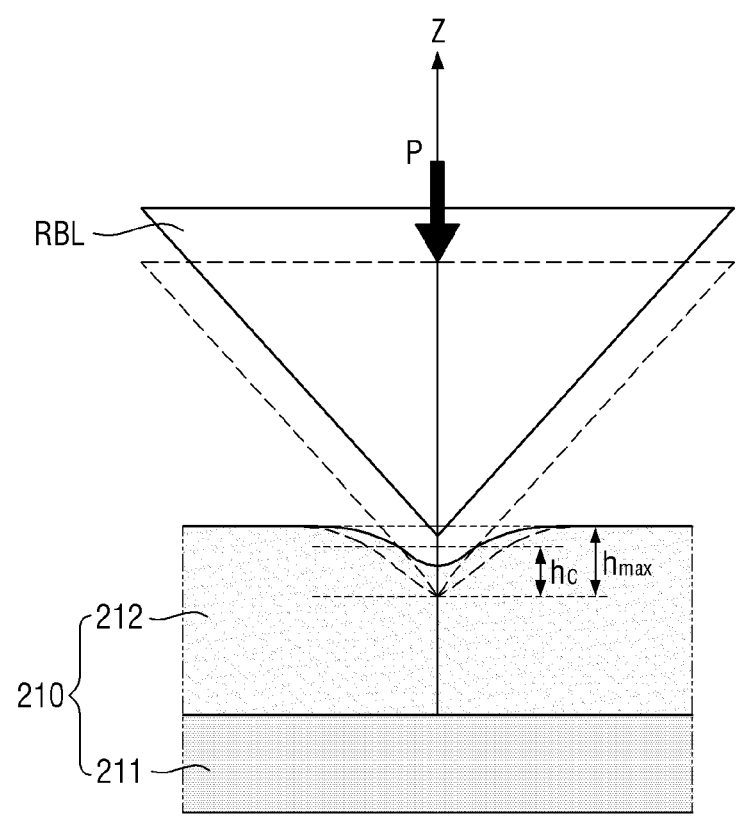
FIG. 14 is a cross-sectional view illustrating an embodiment of a method of measuring modulus and hardness of a first protective layer by an indenter.
Figure 15:
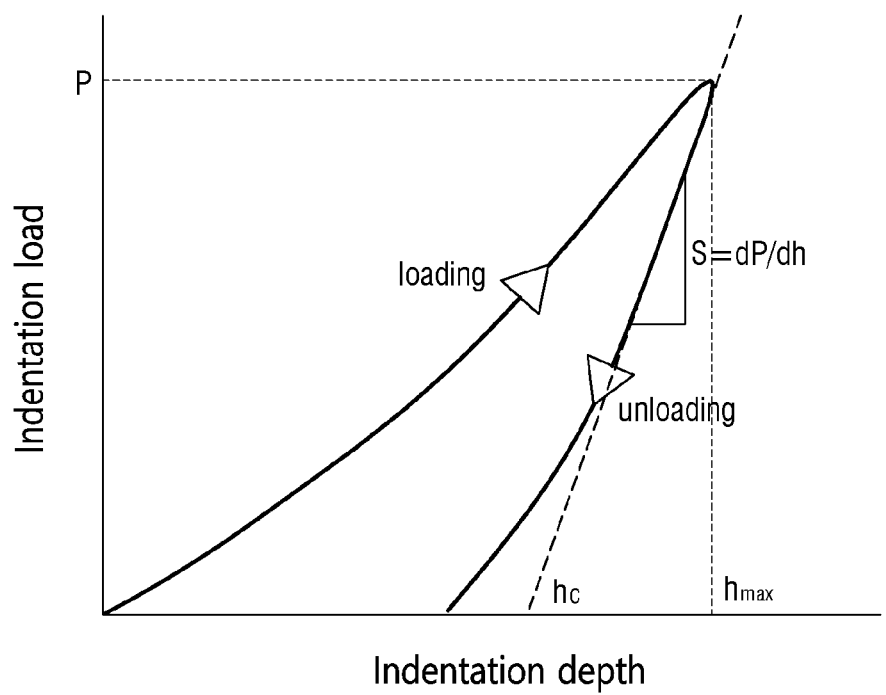
FIG. 15 is a graph illustrating a relationship between indentation depth and load.
Figure 16:
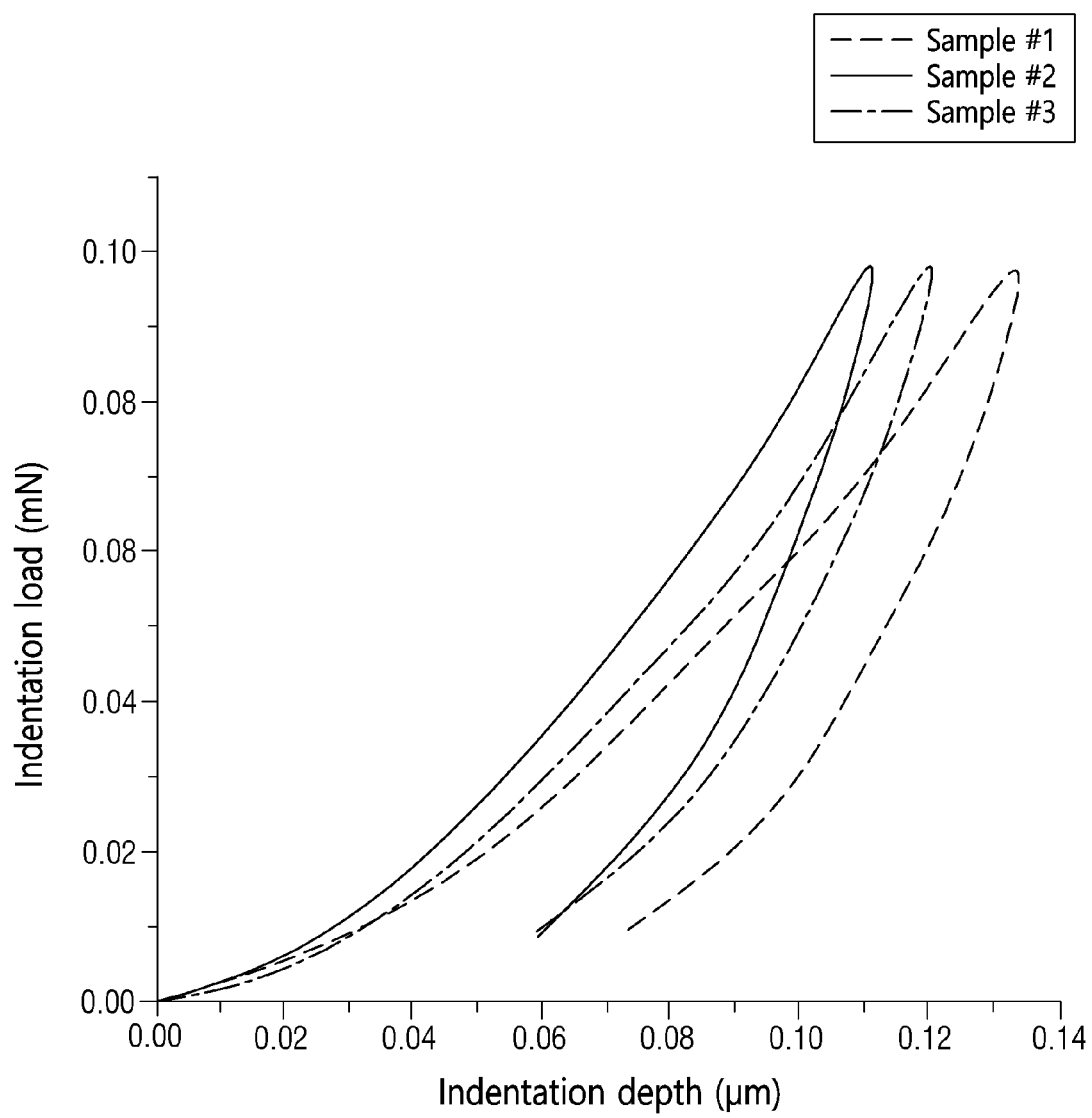
FIG. 16 is a graph illustrating a relationship between the indentation depth and load of a first protective layer according to Experimental Example 1.

FIG. 14 is a schematic cross-sectional view illustrating an embodiment of a method of measuring modulus and hardness of a first protective layer by an indenter, FIG. 15 is a graph illustrating a relationship between indentation depth and load, and FIG. 16 is a graph illustrating a relationship between the indentation depth and load of a first protective layer according to Experimental Example 1. In FIGS. 14 and 15, $h_{max}$ refers to an indentation depth at a point of reaching the maximum load, and $h_c$ refers to an actual indentation depth (excluding influence of peripheral indentation).

For the measurement of hardness and modulus, an Ultra nano hardness tester (model name: GMbH, manufactured by Anton-Paar Corporation) was used, and a Berkovich diamond tip was used as an indenter. In the indenter evaluation method, the prepared samples were attached to a flat holder and placed on a plate, 15 surface measuring points are selected by a microscope, and then measurement conditions are input to a load-indentation depth curve. Modulus and hardness are calculated through the Oliver & Parr model equation through the measured curve.

Specifically, referring to FIG. 14, the cover window protective film 210 is cut to a size of 2 cm×2 cm, attached to a flat holder, and then placed on a plate. Subsequently, an indenter RBL is pressed to apply a force of a maximum load of 0.2 millinewton (mN) to the surface of the first protective layer 212, and an indentation depth are measured while performing the pressing at a loading/unloading speed (pressing speed) of 0.2 millinewton per minute (mN/min). Tests are performed at 15 points, and the indentation depth is expressed as an average value of the results of several tests.

Referring to FIG. 15, a load-indentation depth curve may be obtained by an indenter evaluation method. In the load-indentation depth curve, as the indentation load of the indenter increases, the indention depth increases, and the maximum indentation depth $h_{max}$ is obtained at the maximum indentation load. When the indenter is unloaded, the indentation depth decreases, and the greater the restoring force, the smaller the size of the indentation depth after completion of the indenter unloading. The actual indentation depth may be illustrated through the slope S of the curve during unloading.

TABLE 3

| Sample (#) | | Sample #1 | Sample #2 | Sample #3 |
|---|---|---|---|---|
| Surface properties (nanoindenter) | Hardness (GPa) | 0.38 | 0.40 | 0.35 |
| | Modulus (GPa) | 3.9 | 5.2 | 4.3 |

First, referring to FIG. 16, the load-indentation depth curve obtained through Experimental Example 1 is illustrated. At a maximum indentation load of 0.10 mN/min, each of the samples exhibits a maximum indentation depth in a range of 0.10 μm to 0.14 μm, and a restoration indentation depth in a range of 0.05 μm to 0.08 μm after completion of unloading. Through this load-indentation depth curve, the modulus and hardness shown in Table 3 above are calculated through the Oliver & Parr model equation.

Referring to Table 3 above, each of sample #1, sample #2, and sample #3 exhibits hardness in a range of 0.35 GPa to 1.00 GPa. Further, sample #2 exhibits a modulus in a range of 4.5 to 10 GPa, but each of sample #1 and sample #3 exhibits a modulus of less than 4.5 GPa.

Figure 17:
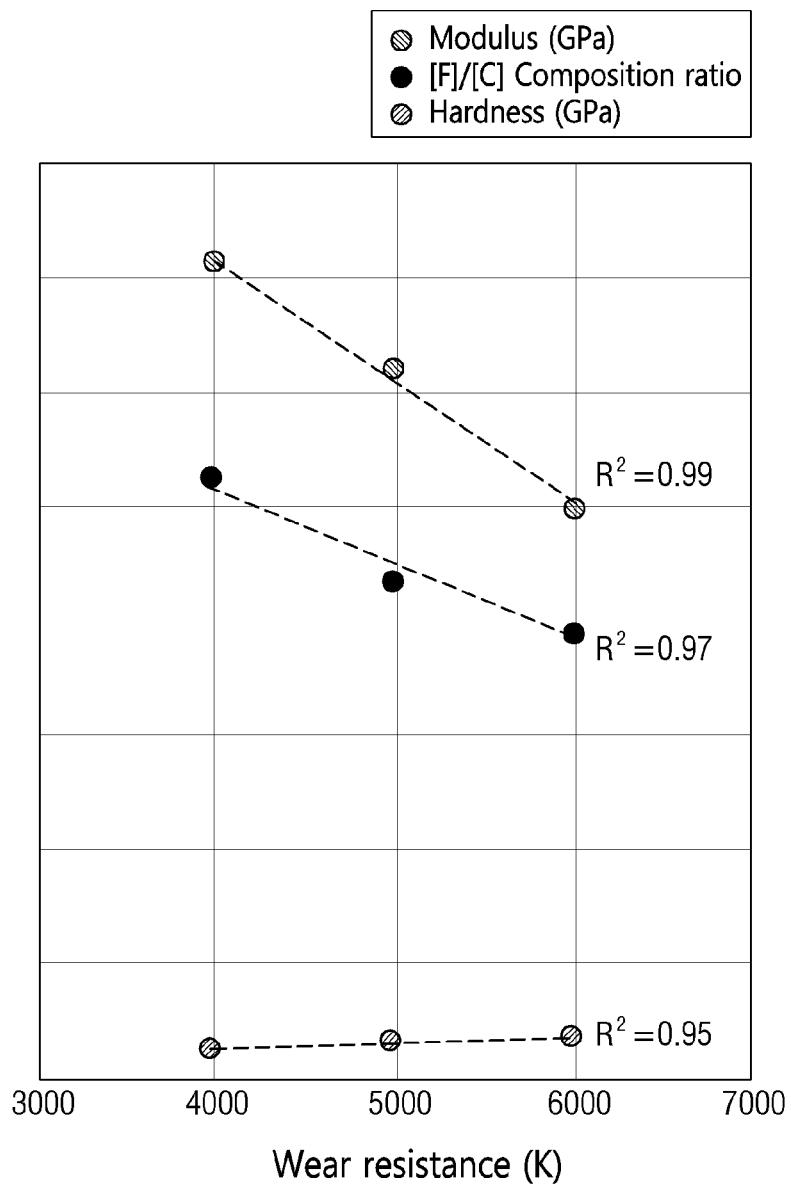
FIG. 17 is a graph illustrating a relationship between wear resistance and modulus, [F]/[C] composition ratio, and hardness.
Figure 18:
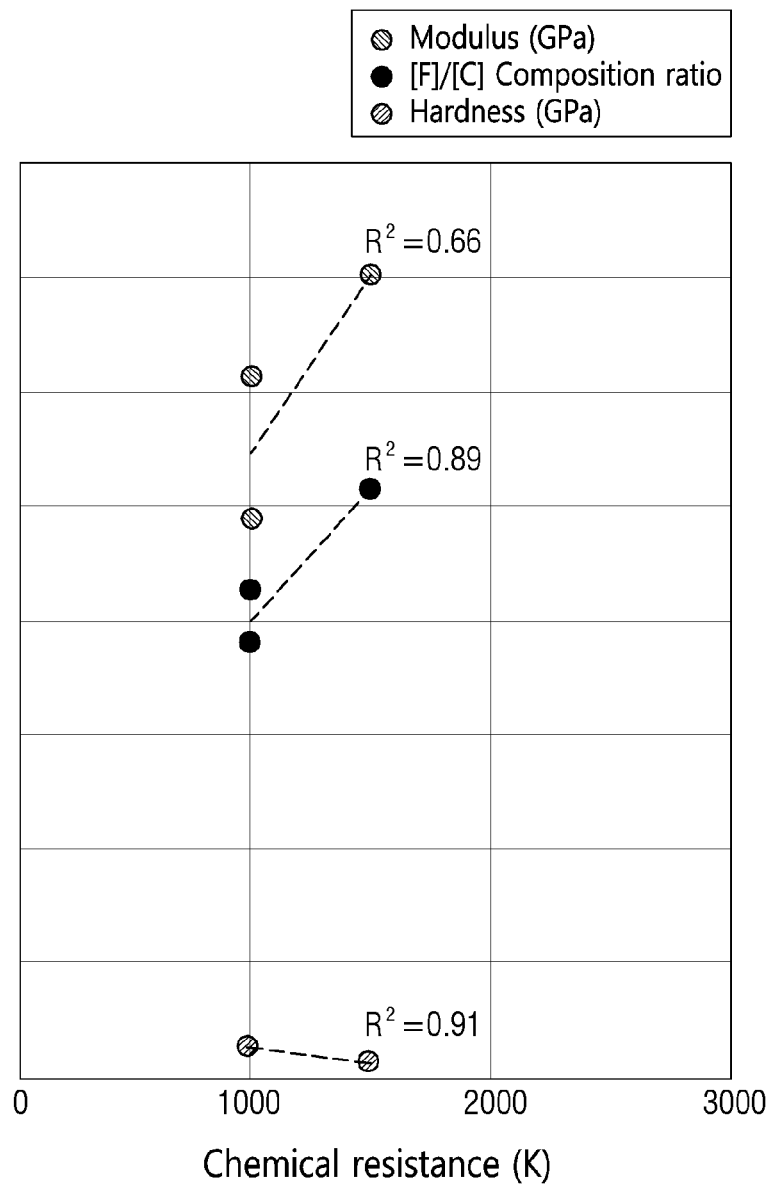
FIG. 18 is a graph illustrating a relationship between chemical resistance and modulus, [F]/[C] composition ratio, and hardness.

Experimental Example 2: Evaluation of Wear Resistance and Chemical Resistance of Cover Window Protective Film Evaluation of wear resistance and chemical resistance was performed using the prepared samples. Evaluation of wear resistance was performed by measuring the number of reciprocations when damage to the surface of sample is viewed while reciprocating an industrial pencil eraser having a size of 6.2 mm×150 mm of MINOAN Corporation on the upper surface of the first protective layer several times. During evaluation, the applied load of the eraser was 1 kilogram (kg), the repetitive reciprocation speed thereof was 40 reciprocations/min, the stroke thereof was 15 mm, the protrusion distance of the eraser from the end of an evaluation rod was 5 mm. Further, evaluation of chemical resistance was performed while introducing 99.3% alcohol into the eraser every 1 mL per 50 times during the evaluation of wear resistance. The results thereof are shown in Table 4 below and FIGS. 17 and 18. In Table 4 below, 'K' means 1000 times of reciprocations of the pencil eraser. FIG. 17 is a graph illustrating a relationship between wear resistance and modulus, [F]/[C] composition ratio, and hardness, and FIG. 18 is a graph illustrating a relationship between chemical resistance and modulus, [F]/[C] composition ratio, and hardness.

TABLE 4

| | Sample (#) | Sample #1 | Sample #2 | Sample #3 |
|---|---|---|---|---|
| Characteristics evaluation results | Wear resistance (K, times) | 6K | 4K | 5K |
| | Chemical resistance (K, times) | less than 1K | 1.5K | less than 1K |

Referring to Table 4 above, each of sample #1, sample #2, and sample #3 exhibits wear resistance of 3K or more. Further, sample #2 exhibits chemical resistance of 1K or more, but each of sample #1 and sample #3 exhibits chemical resistance of less than 1K.

Referring to FIG. 17, as wear resistance increases, hardness tends to increase proportionally, but modulus and [F]/[C] composition ratio tends to decrease. Further, as chemical resistance increases, hardness tends to decrease, but modulus and [F]/[C] composition ratio tends to increase proportionally.

Experimental Example 3: Evaluation of Characteristics of Cover Window Protective Film The surface composition ratio, hardness, modulus, wear resistance, and chemical resistance of the second protective layer according to sample #4 of Preparation Example were measured under the same conditions as in Experimental Examples 1 and 2. The results thereof are given in Table 5.

TABLE 5

| | Sample (#) | Sample #4 |
|---|---|---|
| Surface composition (XPS) | F (at %) | 37.5 |
| | [F]/[C] composition ratio | 0.99 |
| Physical properties (nanoindenter) | Hardness (GPa) | 0.39 |
| | Modulus (GPa) | 5.23 |
| Characteristics evaluation results | Wear resistance (K, times) | 5K |
| | Chemical resistance (K, times) | 2K |

Referring to Table 5 above, in sample #4, the atomic ratio of fluorine (F) at the surface thereof is in a range of 10 at % to 40 at %, and a ratio of the atomic ratio of fluorine (F) to the atomic ratio of carbon (C) ([F]/[C]) is in a range of 0.15 to 1.2. Further, sample #4 exhibits hardness is in a range of 0.35 GPa to 1.00 GPa, and exhibits a modulus is in a range of 4.5 GPa to 10 GPa. Further, sample #4 exhibits wear resistance of 3K or more and chemical resistance of 1K or more.

According to embodiments of the invention, the first protective layer of the cover window protective film may have a specific range of hardness and modulus, and the atomic ratio (at %) of fluorine (F) measured at the surface of the first protective layer may be within a specific range such that the cover window protective film is not damaged even if the display device repeats folding and unfolding several times. In embodiments, the first protective layer of the cover window protective film may have anti-fingerprint characteristics such that fingerprints do not remain on the surface thereof when a user uses the display device.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. A display device, comprising:
a display panel; and
a front laminate structure disposed on a front surface of the display panel,
wherein the front laminate structure includes a cover window and a cover window protective film attached onto the cover window,
the cover window protective film includes a base layer and a first protective layer disposed on the base layer,
wherein the first protective layer includes a fluorine-based compound comprising a first polymer and a second polymer, which is fluorine-based and has anti-fingerprint characteristics,
the first protective layer includes a lower surface adjacent to the base layer and an upper surface opposite to the lower surface,
the second polymer being crosslinked with the first polymer and polymerized within a body of the first protective layer to form fluorinated chains extending up to and through the upper surface, and
the first protective layer has an atomic ratio of fluorine (F) higher at the upper surface of the first protective layer than at the lower surface of the first protective layer.

2. The display device of claim 1,
wherein the front laminate structure further includes a polarization member disposed between the display panel and the cover window, and
a polarization member coupling member which attaches the polarization member to the front surface of the display panel.

3. The display device of claim 2,
wherein the front laminate structure further includes a shock absorbing layer disposed between the polarization member and the cover window, and
a shock absorbing layer coupling member which attaches the shock absorbing layer onto the polarization member.

4. The display device of claim 1, further comprising:
a back laminate structure disposed on a back surface of the display panel, and
the back laminate structure includes a polymer film layer disposed behind the display panel, a cushion layer disposed behind the polymer film layer, a plate disposed behind the cushion layer, and a heat dissipation member disposed behind the plate.

5. The display device of claim 1,
wherein an atomic ratio of fluorine (F) at the upper surface of the first protective layer is in a range of about 10 at % to about 40 at %,
the first protective layer further includes carbon (C), a ratio of the atomic ratio of fluorine (F) to the atomic ratio of carbon (C) at the upper surface of the first protective layer is in a range of about 0.15 to about 1.20, and the atomic ratio of fluorine (F) and the atomic ratio of carbon (C) are values measured by X-ray photoelectron spectroscopy.

6. The display device of claim 1, wherein the upper surface of the first protective layer has a modulus in a range of about 4.5 GPa to about 10 GPa, the upper surface of the first protective layer has a hardness in a range of about 0.35 GPa to about 1.00 GPa, and the modulus and hardness are values measured by a nanoindenter.

7. The display device of claim 1, wherein the first protective layer has a thickness in a range of about 2 μm to about 7 μm.

8. The display device of claim 1, further comprising:

a second protective layer disposed on the upper surface of the first protective layer, wherein an upper surface of the second protective layer has a modulus in a range of about 4.5 GPa to about 10 GPa and a hardness in a range of about 0.35 GPa to about 1.00 GPa.

9. The display device of claim 1, wherein the display panel displays an image in a forward direction.

10. The display device of claim 1, wherein the display device is an in-foldable display device, in which a display surface is folded inward, or an out-foldable display device, in which the display surface is folded outward.

11. A display device, comprising:

a display panel; and a front laminate structure disposed on a front surface of the display panel, wherein the front laminate structure includes a cover window and a cover window protective film attached onto the cover window, the cover window protective film includes a base layer and a first protective layer disposed on the base layer, wherein the first protective layer includes a fluorine-based compound, the first protective layer includes a lower surface adjacent to the base layer and an upper surface opposite to the lower surface, and the first protective layer has an atomic ratio of fluorine (F) higher at the upper surface of the first protective layer than at the lower surface of the first protective layer and gradually increasing from the lower surface toward the upper surface.

12. The display device of claim 11, wherein the atomic ratio of fluorine (F) is the highest at the upper surface of the first protective layer, and wherein the atomic ratio of fluorine (F) at the upper surface of the first protective layer is in a range of about 10 at % to about 40 at %.

13. The display device of claim 12, wherein the first protective layer further includes carbon (C), and a ratio of the atomic ratio of fluorine (F) to the atomic ratio of carbon (C) at the upper surface of the first protective layer is in a range of about 0.15 to about 1.20.

14. The display device of claim 13, wherein the atomic ratio of fluorine (F) and the atomic ratio of carbon (C) are values measured by X-ray photoelectron spectroscopy.

15. The display device of claim 11, wherein the upper surface of the first protective layer has a modulus in a range of about 4.5 GPa to about 10 GPa.

16. The display device of claim 15, wherein the upper surface of the first protective layer has a hardness in a range of about 0.35 GPa to about 1.00 GPa.

17. The display device of claim 16, wherein the modulus and hardness are values measured by a nanoindenter.

18. The display device of claim 11, wherein the first protective layer has a thickness in a range of about 2 μm to about 7 μm.

19. The display device of claim 11, further comprising:

a second protective layer disposed on the upper surface of the first protective layer, wherein an upper surface of the second protective layer has a modulus in a range of about 4.5 GPa to about 10 GPa and a hardness in a range of about 0.35 GPa to about 1.00 GPa.

20. An electronic device, comprising:

a display panel; and a front laminate structure disposed on a front surface of the display panel, wherein the front laminate structure includes a cover window and a cover window protective film attached onto the cover window, the cover window protective film includes a base layer and a first protective layer disposed on the base layer, wherein the first protective layer includes a fluorine-based compound comprising a first polymer and a second polymer, which is fluorine-based and has anti-fingerprint characteristics, the first protective layer includes a lower surface adjacent to the base layer and an upper surface opposite to the lower surface, the second polymer being crosslinked with the first polymer and polymerized within a body of the first protective layer to form fluorinated chains extending up to and through the upper surface, and the first protective layer has an atomic ratio of fluorine (F) higher at the upper surface of the first protective layer than at the lower surface of the first protective layer.

* * * * *